(12) United States Patent
Gornal M.

(10) Patent No.: US 11,750,509 B1
(45) Date of Patent: Sep. 5, 2023

(54) PREVENTING UNICAST TRAFFIC LOOPS DURING ACCESS LINK FAILURES

(71) Applicant: Juniper Networks, Inc., Sunnyvale, CA (US)

(72) Inventor: Vinod Kumar Gornal M., Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/449,119

(22) Filed: Sep. 28, 2021

(51) Int. Cl.
*H04L 45/42* (2022.01)
*H04L 45/00* (2022.01)
*H04L 45/28* (2022.01)

(52) U.S. Cl.
CPC .............. *H04L 45/42* (2013.01); *H04L 45/22* (2013.01); *H04L 45/28* (2013.01); *H04L 45/38* (2013.01)

(58) Field of Classification Search
CPC ......... H04L 45/42; H04L 45/22; H04L 45/28; H04L 45/38
See application file for complete search history.

(56) References Cited

U.S. PATENT DOCUMENTS

| | | | |
|---|---|---|---|
| 9,485,135 B1* | 11/2016 | Sarkar ..................... | H04L 45/22 |
| 9,628,409 B1* | 4/2017 | Yuvaraj ................. | H04L 49/201 |
| 10,868,697 B2 | 12/2020 | Gao et al. | |
| 2014/0126422 A1* | 5/2014 | Bragg .................... | H04L 12/462 370/255 |
| 2017/0288948 A1* | 10/2017 | Singh .................. | H04L 41/0668 |
| 2018/0091445 A1* | 3/2018 | Singh ..................... | H04L 45/22 |
| 2018/0109444 A1* | 4/2018 | Sajassi .................... | H04L 45/74 |
| 2019/0222431 A1* | 7/2019 | Gao ........................ | H04L 45/18 |
| 2020/0120408 A1 | 4/2020 | Boyd et al. | |
| 2021/0152464 A1* | 5/2021 | Brissette ................. | H04L 45/28 |

FOREIGN PATENT DOCUMENTS

| | | | | |
|---|---|---|---|---|
| WO | 2018120798 A1 | 7/2018 | | |
| WO | WO-2018120798 A1 * | 7/2018 | ......... | H04L 12/1877 |

\* cited by examiner

*Primary Examiner* — Chris Parry
*Assistant Examiner* — Dixon F Dabipi
(74) *Attorney, Agent, or Firm* — Harrity & Harrity, LLP

(57) ABSTRACT

A first network device may receive a flow of unicast packets with a loop prevention bit set. The flow of unicast packets may be received from a second network device associated with a non-operational link provided between the second network device and a destination device. The second network device may be a peer of the first network device. The first network device may determine whether a link provided between the first network device and the destination device is operational, and may forgo returning the flow of unicast packets to the second network device when the link provided between the first network device and the destination device is non-operational and based on the loop prevention bit.

20 Claims, 9 Drawing Sheets

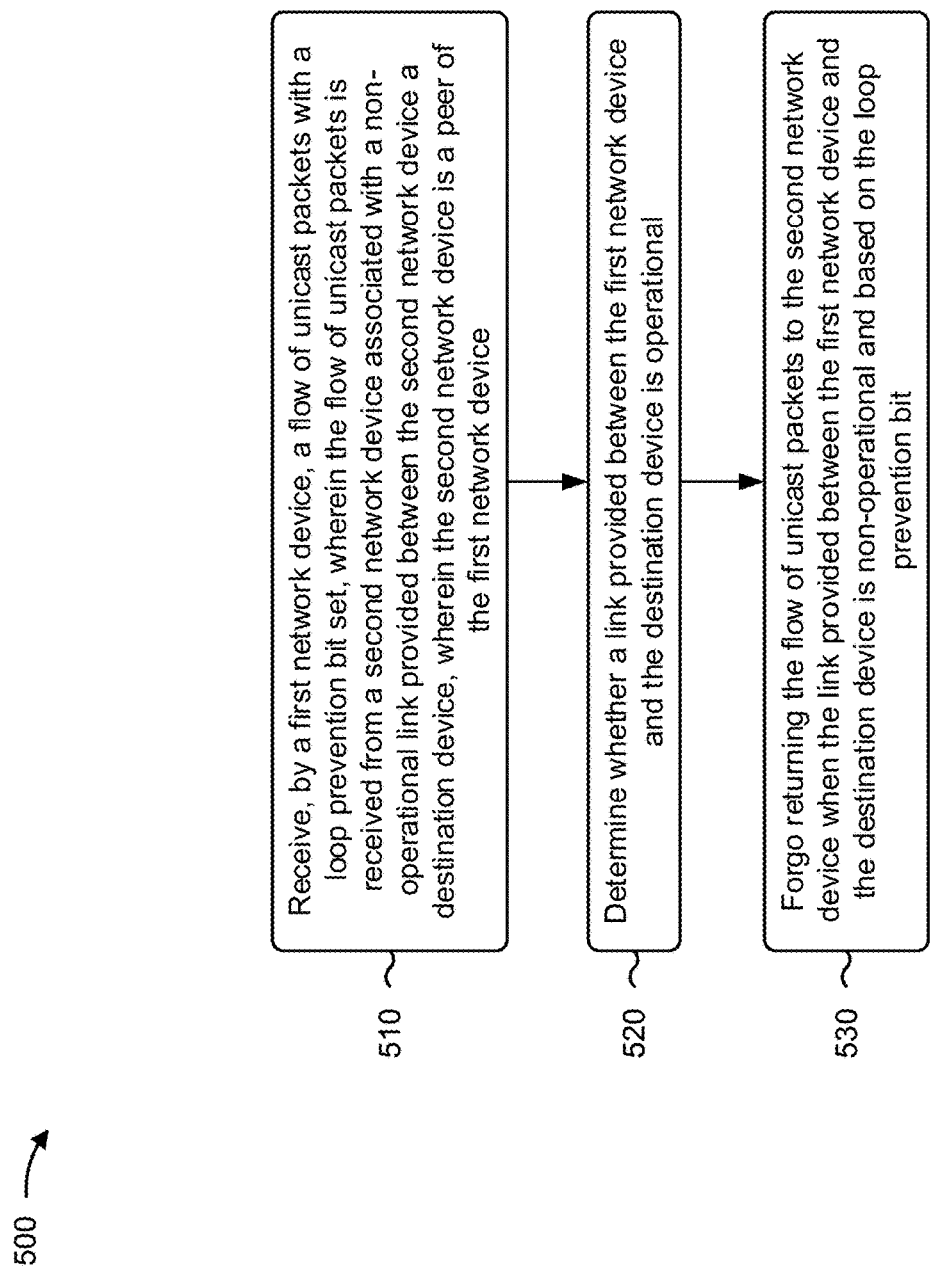

US 11,750,509 B1

PREVENTING UNICAST TRAFFIC LOOPS DURING ACCESS LINK FAILURES

BACKGROUND

Ethernet virtual private network (EVPN)-virtual extensible local area network (VXLAN) is a network fabric that extends layer 2 connectivity as a network overlay over an existing physical network. EVPN-VXLAN may create more agile, secure, and scalable networks for campuses and/or data centers. EVPN may be used as an overlay control plane and may provide virtual connectivity between different layer 2/3 domains over a network. VXLAN is a network virtualization overlay protocol that expands layer 2 network address space.

SUMMARY

Some implementations described herein relate to a method. The method may include receiving, by a first network device, a flow of unicast packets with a loop prevention bit set. The flow of unicast packets may be received from a second network device associated with a non-operational link provided between the second network device and a destination device. The second network device may be a peer of the first network device. The method may include determining whether a link provided between the first network device and the destination device is operational, and forgoing returning the flow of unicast packets to the second network device when the link provided between the first network device and the destination device is non-operational and based on the loop prevention bit.

Some implementations described herein relate to a first network device. The first network device may include one or more memories and one or more processors. The flow of unicast packets may be received from a second network device associated with a non-operational link provided between the second network device and a destination device. The second network device may be a peer of the first network device. The one or more processors may be configured to receive a flow of unicast packets with a loop prevention bit set, and determine whether a link provided between the first network device and the destination device is operational. The one or more processors may be configured to forgo returning the flow of unicast packets to the second network device when the link provided between the first network device and the destination device is non-operational and based on the loop prevention bit, and drop the flow of unicast packets when the link provided between the first network device and the destination device is non-operational.

Some implementations described herein relate to a non-transitory computer-readable medium that stores a set of instructions for a first network device. The flow of unicast packets may be received from a second network device associated with a non-operational link provided between the second network device and a destination device. The second network device may be a peer of the first network device. The set of instructions, when executed by one or more processors of the first network device, may cause the first network device to receive a flow of unicast packets with a loop prevention bit set, and determine whether a link provided between the first network device and the destination device is operational. The set of instructions, when executed by one or more processors of the first network device, may cause the first network device to provide the flow of unicast packets to the destination device when the link provided between the first network device and the destination device is operational, and forgo returning the flow of unicast packets to the second network device when the link provided between the first network device and the destination device is non-operational and based on the loop prevention bit.

BRIEF DESCRIPTION OF THE DRAWINGS

FIG. 5 is a flowchart of an example process for preventing unicast traffic loops during access link failures.

DETAILED DESCRIPTION

Figure 1A:
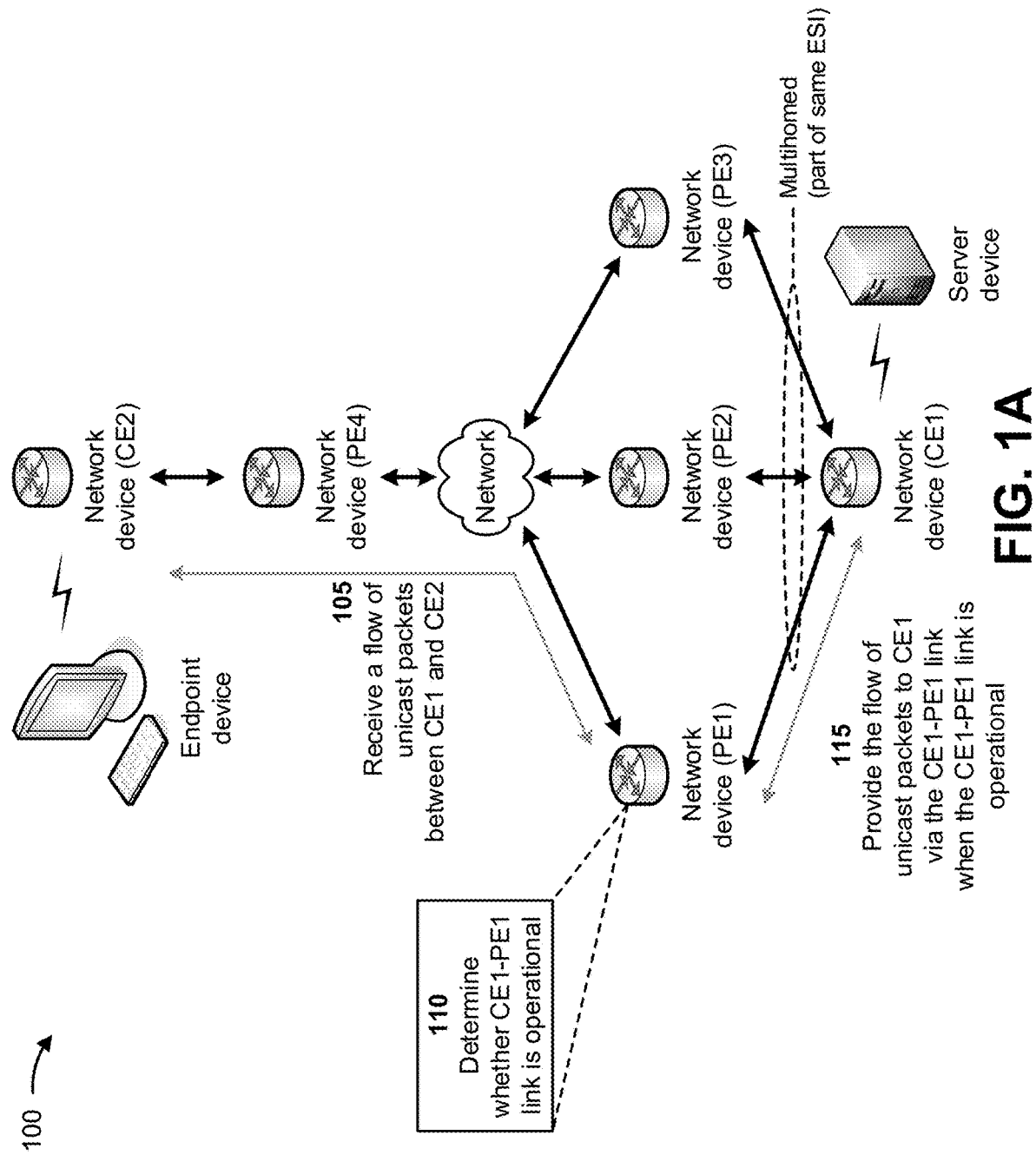
FIGS. 1A-1E are diagrams of an example associated with preventing unicast traffic loops during access link failures.

The following detailed description of example implementations refers to the accompanying drawings. The same reference numbers in different drawings may identify the same or similar elements.

An EVPN-VXLAN may include a first customer edge (CE) device that is multihomed to a first provider edge (PE) device, a second PE device, and a third PE device. A second CE device may be attached to a fourth PE device. For a flow of unicast packets from the second CE device to the first CE device, the fourth PE device may provide the unicast packets to one of the first PE device, the second PE device, or the third PE device, such as the first PE device. The first PE device may forward the unicast packets to the first CE device. If a link provided between the first CE device and the first PE device is non-operational (e.g., due to a link failure), the first PE device may provide the unicast packets to the second PE device or the third PE device. However, traffic provided from the fourth PE device to the first PE device is dropped (e.g., due to the non-operational link) until the fourth PE device learns the non-operational link state and provides traffic to the second PE device or the third PE device.

The first PE device, the second PE device, and the third PE device may be programmed to redirect (e.g., fast-reroute) traffic to one of the other two PE devices when a link with a CE device becomes non-operational. Such functionality may enable faster convergence and reduce a quantity of dropped traffic. For example, the first PE device may receive traffic from the fourth PE device and may provide the traffic to the second PE device when the link provided between the first CE device and the first PE device is non-operational. The second PE device may forward the traffic to the second CE device. However, if a link provided between the first CE device and the second PE device also becomes non-operational, the second PE device may return the traffic to the first PE device. This creates a unicast traffic loop between the first PE device and the second PE device.

Thus, current techniques for handling a flow of unicast packets consume computing resources (e.g., processing resources, memory resources, communication resources, and/or the like), networking resources, and/or the like, are associated with delaying unicast traffic transmission through a network due to a link failure, losing unicast traffic due to the link failure, creating a unicast traffic loop, handling lost unicast traffic caused by the link failure, and/or the like.

Some implementations described herein relate to a network device that prevents unicast traffic loops during access link failures. For example, a first network device may receive a flow of unicast packets with a loop prevention bit set. The flow of unicast packets may be received from a second network device associated with a non-operational link provided between the second network device and a destination device. The second network device may be a peer of the first network device. The first network device may determine whether a link provided between the first network device and the destination device is operational, and may forgo returning the flow of unicast packets to the second network device when the link provided between the first network device and the destination device is non-operational and based on the loop prevention bit.

In this way, the network device prevents unicast traffic loops during access link failures. For example, a first PE device (e.g., a network device) may prevent unicast traffic loops by including a loop prevention bit in a VXLAN header associated with unicast traffic to be redirected. The loop prevention bit may provide an indication that the first PE device is an Ethernet segment identifier (ESI) peer PE device. The first PE device redirects unicast traffic (e.g., destined for a CE device) to a second PE device, and the second PE device may determine whether a link provided between the second PE device and the CE device is operational. If the link provided between the second PE device and the CE device is non-operational, the second PE device may not return the unicast traffic to the first PE device based on the loop prevention bit, which may prevent a unicast traffic loop. Thus, the network device conserves computing resources, networking resources, and/or the like that would otherwise have been consumed by delaying unicast traffic transmission through a network due to a link failure, losing unicast traffic due to the link failure, creating a unicast traffic loop, handling lost unicast traffic caused by the link failure, and/or the like.

FIGS. 1A-1E are diagrams of an example 100 associated with preventing unicast traffic loops during access link failures. As shown in FIGS. 1A-1E, example 100 includes an endpoint device, a network of network devices, and a server device. The network devices may include provider edge (PE) devices, customer edge (CE) devices, and/or the like. Further details of the endpoint device, the network, the network devices, and the server device are provided elsewhere herein.

As shown in FIG. 1A, an EVPN-VXLAN may include a first CE device (CE1) that is multihomed to a first PE device (PE1), a second PE device (PE2), and a third PE device (PE3). The first PE device may be an ESI peer device with the second PE device and the third PE device, and the second PE device may be an ESI peer device with the third PE device. A second CE device (CE2) may be attached to a fourth PE device (PE4) that is attached to the network. For a flow of unicast packets from the second CE device to the first CE device, the fourth PE device may provide the unicast packets to one of the first PE device, the second PE device, or the third PE device. In one example, the second CE device may receive the flow of unicast packets from the endpoint device, and the flow of unicast packets may be destined for the server device (e.g., via the first CE device).

As further shown in FIG. 1A, and by reference number 105, the first PE device may receive, from the fourth PE device and via the network, the flow of unicast packets between the second CE device and the first CE device. For example, the fourth PE device may select the first PE device for receipt of the flow of unicast packets, and may provide the flow of unicast packets to the first PE device based on the selection. The first PE device may receive the flow of unicast packets from the fourth PE device.

As further shown in FIG. 1A, and by reference number 110, the first PE device may determine whether a link provided between the first CE device and the first PE device is operational. For example, the first PE device may determine whether the first PE device can communicate with the first CE device. If the first PE device can communicate with the first CE device, the first PE device may determine that the link provided between the first CE device and the first PE device is operational. If the first PE device cannot communicate with the first CE device, the first PE device may determine that the link provided between the first CE device and the first PE device is non-operational (e.g., due to a link failure).

As further shown in FIG. 1A, and by reference number 115, the first PE device may provide the flow of unicast packets to the first CE device, via the link provided between the first CE device and the first PE device, when the link provided between the first CE device and the first PE device is operational. The first CE device may receive the flow of unicast packets and may forward the flow of unicast packets to a destination (e.g., the server device).

Figure 1B:
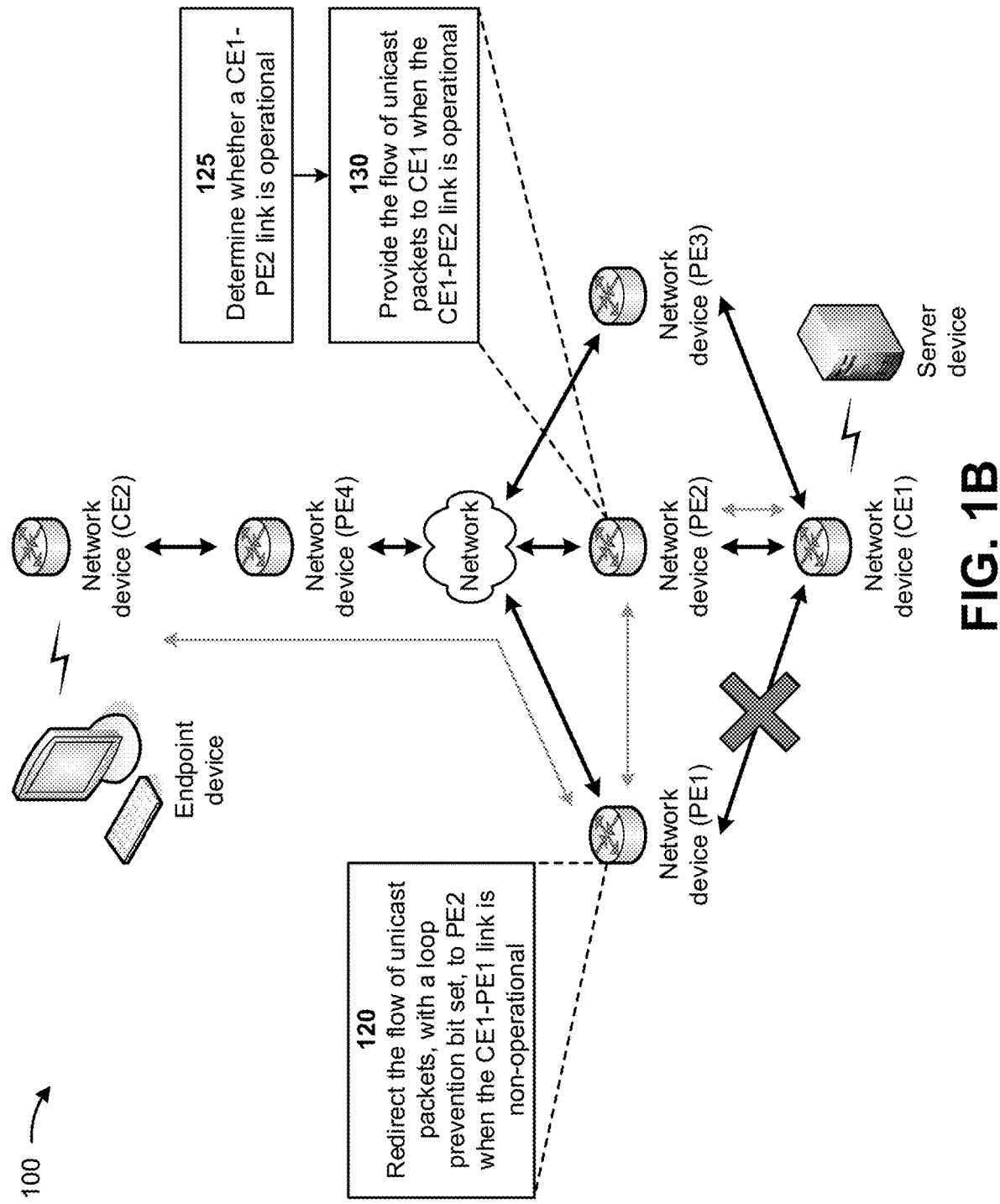

As shown in FIG. 1B, and by reference number 120, the first PE device may redirect the flow of unicast packets, with a loop prevention bit set, to the second PE device when the link provided between the first CE device and the first PE device is non-operational. For example, since the first PE device, the second PE device, and the third PE device are ESI peers, the first PE device, the second PE device, and the third PE device may be programmed to redirect (e.g., fast-reroute) traffic to one of the other two PE devices when a link with a CE device becomes non-operational. Such functionality may enable faster convergence and reduce a quantity of dropped traffic. The first PE device may be programmed to redirect the flow of unicast packets, with the loop prevention bit set, to the second PE device when the link provided between the first CE device and the first PE device is non-operational. In some implementations, the loop prevention bit may be provided in a VXLAN header associated with the flow of unicast packets. In some implementations, the loop prevention bit being set may provide an indication that the flow of unicast packets is received from an ESI peer (e.g., the first PE device) of the second PE device. In some implementations, the loop prevention bit may be provided in an unused reserved bit of a header associated with the flow of unicast packets.

As further shown in FIG. 1B, and by reference number 125, the second PE device may determine whether a link provided between the first CE device and the second PE device is operational. For example, when the second PE device receives the flow of unicast packets, the second PE device may determine whether the second PE device can communicate with the first CE device. If the second PE device can communicate with the first CE device, the second PE device may determine that the link provided between the first CE device and the second PE device is operational. If the second PE device cannot communicate with the first CE device, the second PE device may determine that the link provided between the first CE device and the second PE device is non-operational (e.g., due to a link failure).

As further shown in FIG. 1B, and by reference number 130, the second PE device may provide the flow of unicast packets to the first CE device, via the link provided between the first CE device and the second PE device, when the link provided between the first CE device and the second PE device is operational. The first CE device may receive the flow of unicast packets and may forward the flow of unicast packets to a destination (e.g., the server device).

Figure 1C:
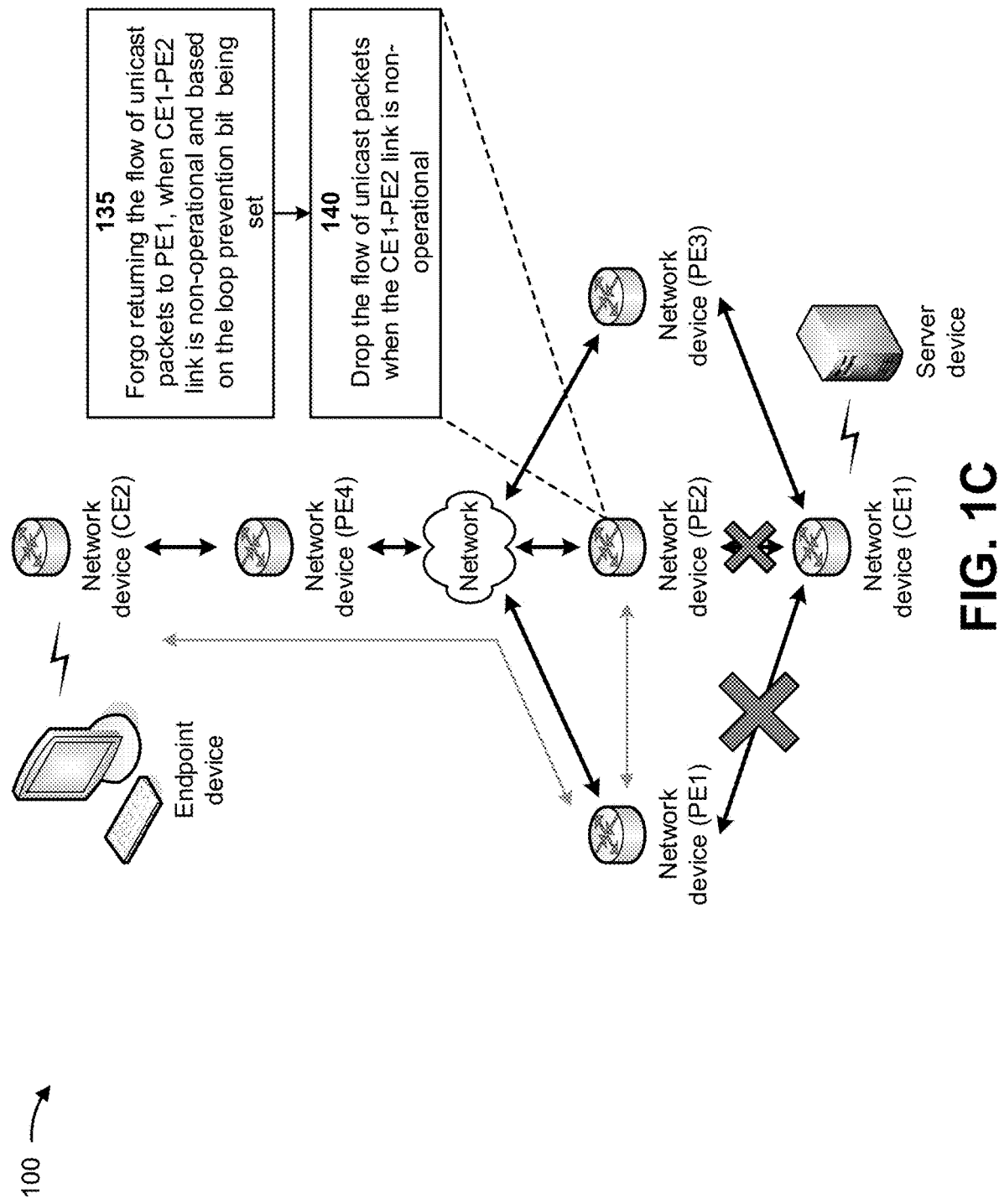

As shown in FIG. 1C, and by reference number 135, the second PE device may forgo returning the flow of unicast packets to the first PE device, when the link provided between the first CE device and the second PE device is non-operational and based on the loop prevention bit being set. For example, if the loop prevention bit was not set, the second PE device would typically return the flow of unicast packets to the first PE device when the link provided between the first CE device and the second PE device is non-operational. The first PE device may then redirect the flow of unicast packets back to the second PE device, which would create a unicast traffic loop between the first PE device and the second PE device. However, since the loop prevention bit is set, the second PE device knows not to return the flow of unicast packets to the first PE device, and may forgo returning the flow of unicast packets to the first PE device when the link provided between the first CE device and the second PE device is non-operational. By forgoing the return of the flow of unicast packets to the first PE device when the link provided between the first CE device and the second PE device is non-operational, the second PE device prevents formation of a unicast packet loop between the first PE device and the second PE device.

As further shown in FIG. 1C, and by reference number 140, the second PE device may drop the flow of unicast packets when the link provided between the first CE device and the second PE device is non-operational. For example, the second PE device may be programmed to drop the flow of unicast packets when the link provided between the first CE device and the second PE device is non-operational. The second PE device may drop the flow of unicast packets until the fourth PE device can determine another route to the first CE device for the flow of unicast packets.

Figure 1D:
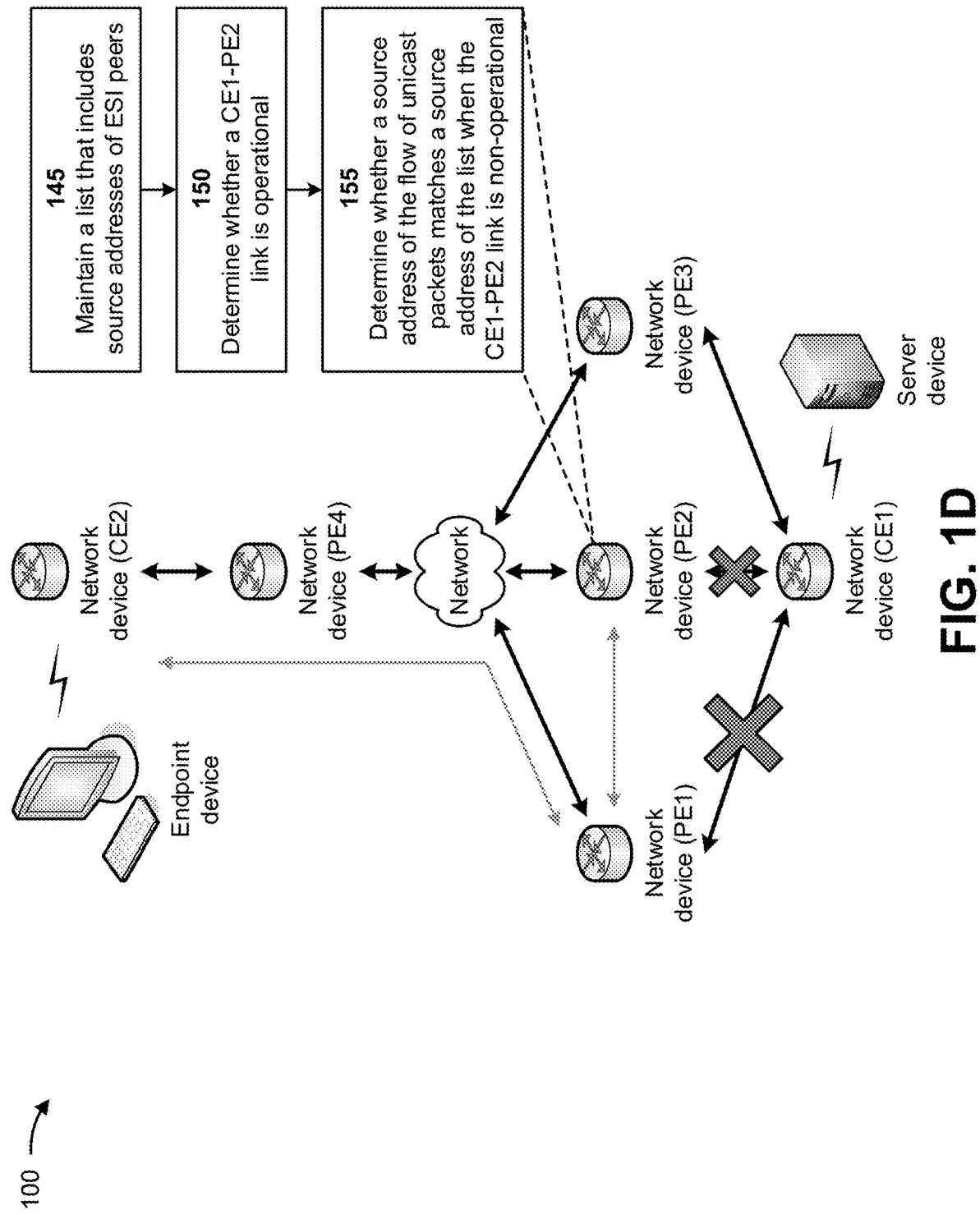

As shown in FIG. 1D, and by reference number 145, the second PE device may, alternatively or additionally, maintain a list that includes source addresses of ESI peer devices. For example, the second PE device may maintain a list that includes a source address of the first PE device and a source address of the third PE device, since the first PE device and the third PE device are ESI peers of the second PE device. Similarly, the first PE device may maintain a list that includes a source address of the second PE device and a source address of the third PE device, and the third PE device may maintain a list that includes a source address of the first PE device and a source address of the second PE device.

As further shown in FIG. 1D, and by reference number 150, the second PE device may determine whether the link provided between the first CE device and the second PE device is operational. For example, when the second PE device receives the flow of unicast packets, the second PE device may determine whether the second PE device can communicate with the first CE device. If the second PE device can communicate with the first CE device, the second PE device may determine that the link provided between the first CE device and the second PE device is operational. If the second PE device cannot communicate with the first CE device, the second PE device may determine that the link provided between the first CE device and the second PE device is non-operational (e.g., due to a link failure).

As further shown in FIG. 1D, and by reference number 155, the second PE device may determine whether a source address of the flow of unicast packets matches a source address of the list when the link provided between the first CE device and the second PE device is non-operational. For example, the source address of the flow of unicast packets may include the source address of the first PE device. Since the list includes the source address of the first PE device, the second PE device may determine that the source address of the flow of unicast packets matches the source address of the list when the link provided between the first CE device and the second PE device is non-operational.

Figure 1E:
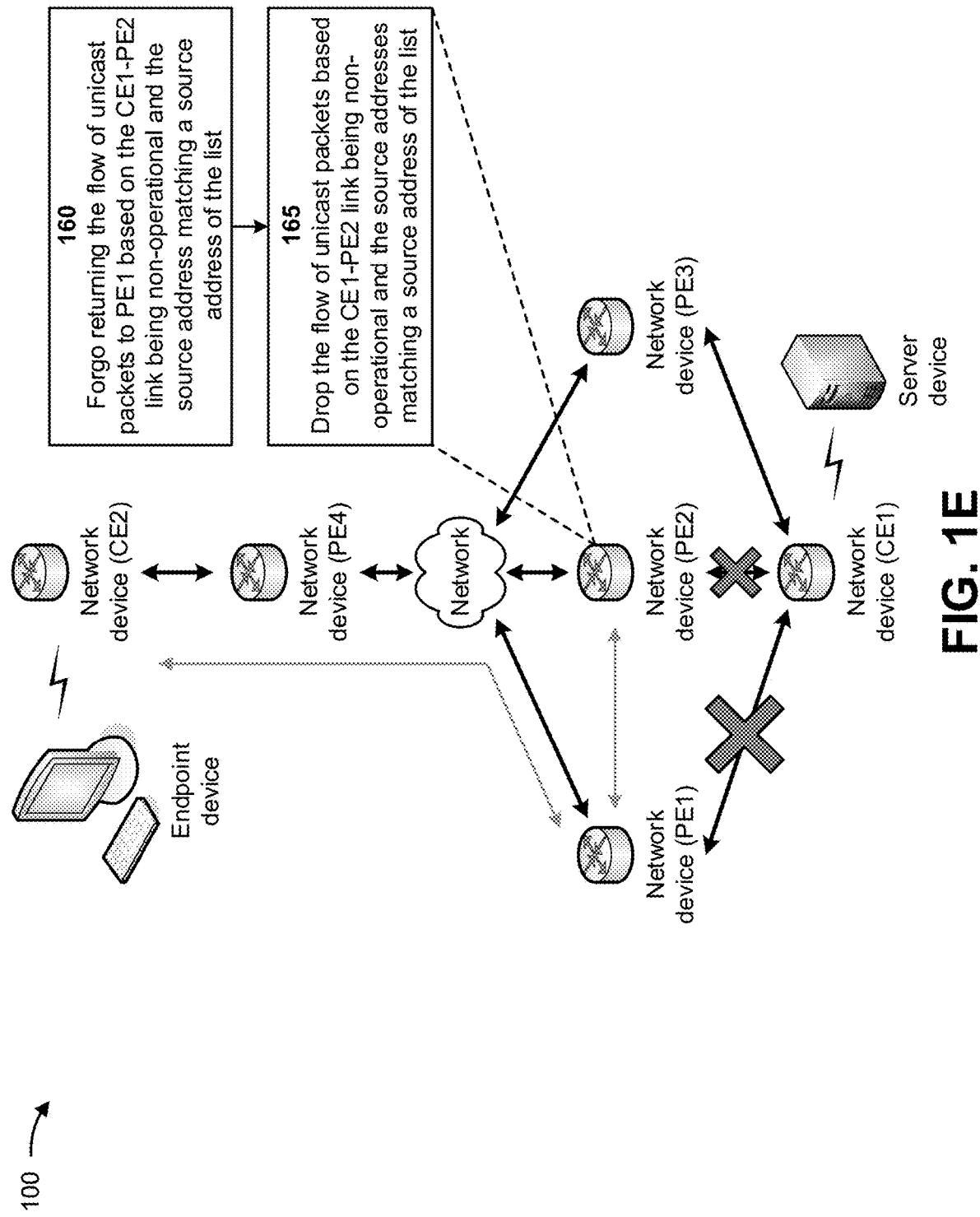

As shown in FIG. 1E, and by reference number 160, the second PE device may forgo returning the flow of unicast packets to the first PE device based on the link provided between the first CE device and the second PE device being non-operational and based on the source address matching a source address of the list. For example, since the source address of the flow of unicast packets matches the source address of the list, the second PE device knows not to return the flow of unicast packets to the first PE device, and may forgo returning the flow of unicast packets to the first PE device when the link provided between the first CE device and the second PE device is non-operational. By forgoing the return of the flow of unicast packets to the first PE device when the link provided between the first CE device and the second PE device is non-operational, the second PE device prevents formation of a unicast packet loop between the first PE device and the second PE device.

As further shown in FIG. 1E, and by reference number 165, the second PE device may drop the flow of unicast packets based on the link provided between the first CE device and the second PE device being non-operational and based on the source address matching a source address of the list. For example, the second PE device may be programmed to drop the flow of unicast packets when the link provided between the first CE device and the second PE device is non-operational. The second PE device may drop the flow of unicast packets until the fourth PE device can determine another route to the first CE device for the flow of unicast packets.

In this way, the network device prevents unicast traffic loops during access link failures. For example, a first PE device (e.g., a network device) may prevent unicast traffic loops by including a loop prevention bit in a VXLAN header associated with unicast traffic to be redirected. The loop prevention bit may provide an indication that the first PE device is an ESI peer PE device. The first PE device redirects unicast traffic (e.g., destined for a CE device) to a second PE device, and the second PE device may determine whether a link provided between the second PE device and the CE device is operational. If the link provided between the second PE device and the CE device is non-operational, the second PE device may not return the unicast traffic to the first PE device based on the loop prevention bit, which may prevent a unicast traffic loop. Thus, the network device conserves computing resources, networking resources, and/ or the like that would otherwise have been consumed by delaying unicast traffic transmission through a network due to a link failure, losing unicast traffic due to the link failure, creating a unicast traffic loop, handling lost unicast traffic caused by the link failure, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
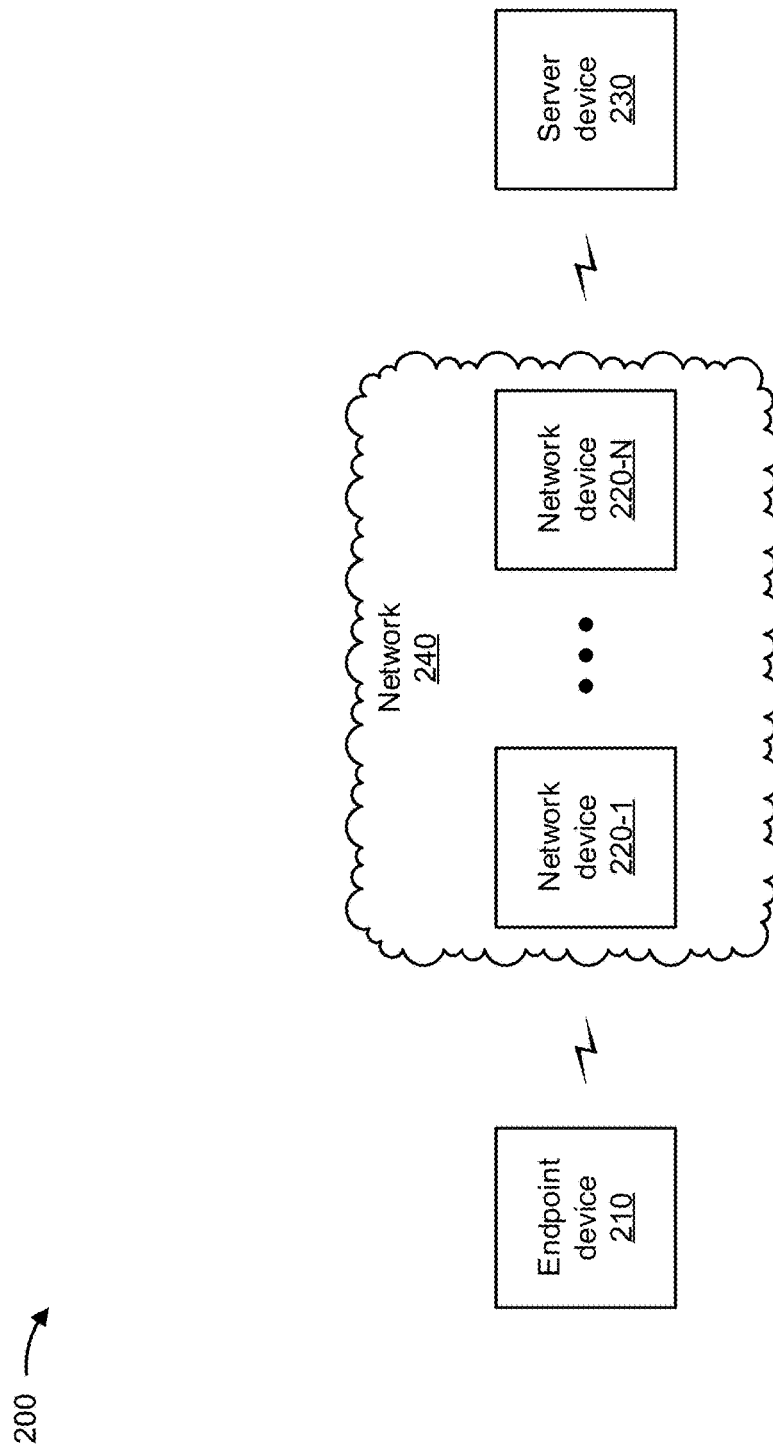
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, and/or providing information, such as information described herein. For example, the server device 230 may include a laptop computer, a tablet computer, a desktop computer, a group of server devices, or a similar type of device, associated with multicast traffic. In some implementations, the server device 230 may receive information from and/or transmit information (e.g., multicast traffic) to the endpoint device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
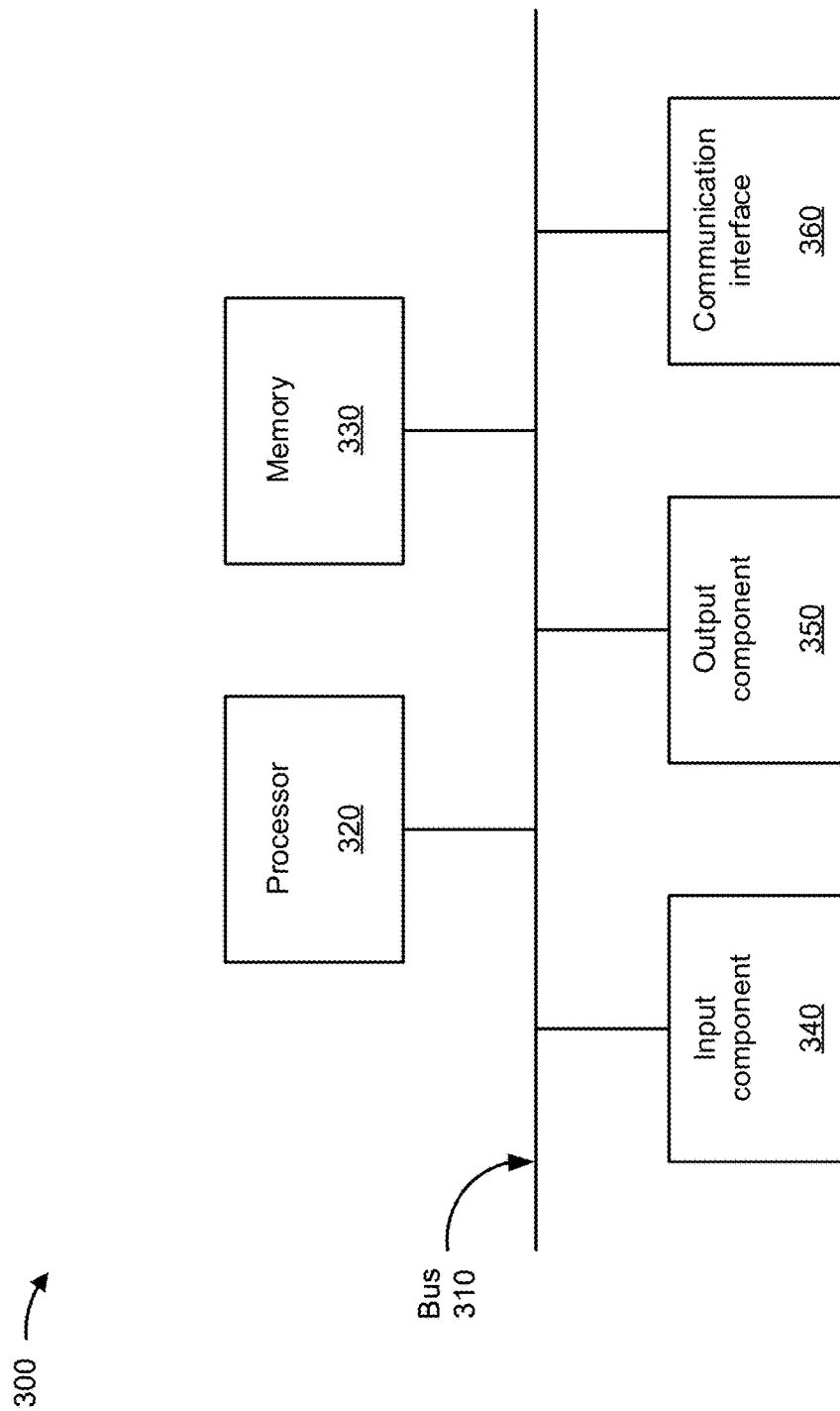
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
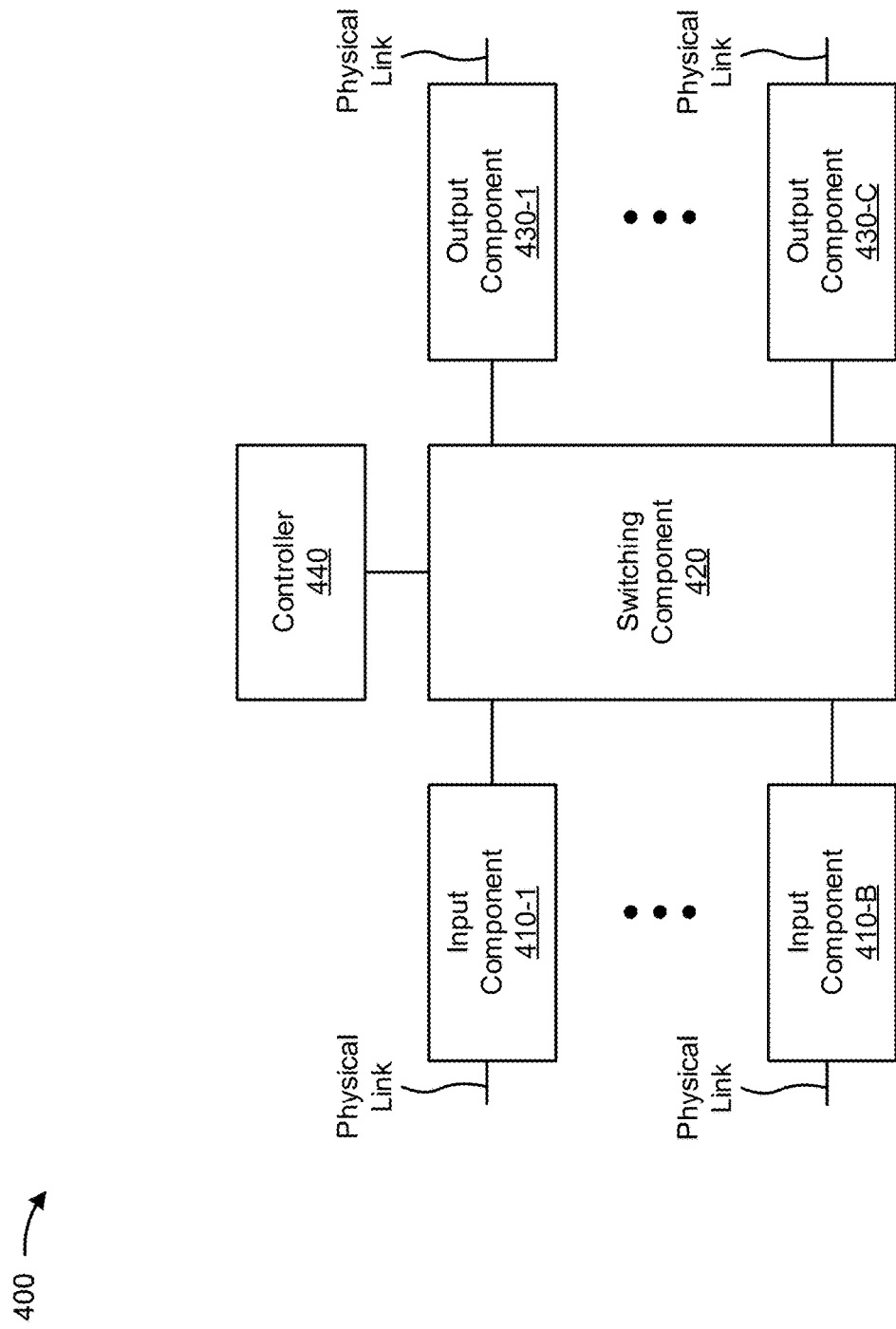

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for preventing unicast traffic loops during access link failures. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a flow of unicast packets with a loop prevention bit set, wherein the flow of unicast packets is received from a second network device associated with a non-operational link provided between the second network device and a destination device, wherein the second network device is a peer of the first network device (block 510). For example, the first network device may receive a flow of unicast packets with a loop prevention bit set, as described above. In some implementations, the flow of unicast packets is received from a second network device associated with a non-operational link provided between the second network device and a destination device, and the second network device is a peer of the first network device. In some implementations, each of the first network device and the second network device is a provider edge network device.

In some implementations, the loop prevention bit is provided in a virtual extensible local area network header associated with the flow of unicast packets. In some implementations, the loop prevention bit being set provides an indication that the flow of unicast packets is received from an Ethernet segment identifier peer of the first network device. In some implementations, the destination device is a customer edge network device.

In some implementations, the first network device and the second network device are associated with an Ethernet virtual private network-virtual extensible local area network. In some implementations, the loop prevention bit is provided in an unused reserved bit of a header associated with the flow of unicast packets.

As further shown in FIG. 5, process 500 may include determining whether a link provided between the first network device and the destination device is operational (block 520). For example, the first network device may determine whether a link provided between the first network device and the destination device is operational, as described above.

As further shown in FIG. 5, process 500 may include forgoing returning the flow of unicast packets to the second network device when the link provided between the first network device and the destination device is non-operational and based on the loop prevention bit (block 530). For example, the first network device may forgo returning the flow of unicast packets to the second network device when the link provided between the first network device and the destination device is non-operational and based on the loop prevention bit, as described above. In some implementations, forgoing returning the flow of unicast packets to the second network device when the link provided between the first network device and the destination device is non-operational prevents formation of a unicast packet loop between the first network device and the second network device.

In some implementations, process 500 includes providing the flow of unicast packets to the destination device when the link provided between the first network device and the destination device is operational.

In some implementations, process 500 includes dropping the flow of unicast packets when the link provided between the first network device and the destination device is non-operational.

In some implementations, process 500 includes maintaining a list that includes source addresses of peers of the first network device; receiving another flow of unicast packets that includes a source address of the second network device; determining whether the source address of the second network device matches one of the source addresses of the list; and forgoing returning the other flow of unicast packets to the second network device when the link provided between the first network device and the destination device is non-operational and based on the source address of the second network device matching one of the source addresses of the list. In some implementations, process 500 includes providing the other flow of unicast packets to the destination device when the link provided between the first network device and the destination device is operational. In some implementations, process 500 includes dropping the other flow of unicast packets when the link provided between the first network device and the destination device is non-operational.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a first provider edge (PE) network device, a flow of unicast packets with a loop prevention bit,
       wherein the flow of unicast packets is received from a second PE network device associated with a non-operational link provided between the second PE network device and a destination device,
       wherein the second PE network device is a peer of the first PE network device, and
       wherein the destination device is multi-homed to the first PE device and the second PE device;
   determining, by the first PE network device, whether a link provided between the first PE network device and the destination device is operational;
   determining, by the first PE network device and when the link provided between the first PE network device and the destination device is not operational, whether the loop prevention bit is set;
   forgoing, by the first PE network device, returning the flow of unicast packets to the second PE network device when the link provided between the first PE network device and the destination device is non-operational and when the loop prevention bit is set; and
   dropping, by the first PE network device, the flow of unicast packets when the link provided between the first PE network device and the destination device is non-operational and when the loop prevention bit is set,
       wherein the flow of unicast packets is returned to the second PE network device when the link provided between the first PE network device and the destination device is non-operational and when the loop prevention bit is not set.

2. The method of claim 1, further comprising:
   providing the flow of unicast packets to the destination device when the link provided between the first PE network device and the destination device is operational.

3. The method of claim 1, wherein the loop prevention bit is provided in an unused reserved bit of a header associated with the flow of unicast packets.

4. The method of claim 1, wherein the first PE network device is an Ethernet segment identifier peer device with the second PE network device.

5. The method of claim 1, further comprising:
   maintaining a list that includes source addresses of peers of the first PE network device;
   receiving another flow of unicast packets that includes a source address of the second PE network device;
   determining whether the source address of the second PE network device matches one of the source addresses of the list; and
   forgoing returning the other flow of unicast packets to the second PE network device when the link provided between the first PE network device and the destination device is non-operational and based on the source address of the second PE network device matching one of the source addresses of the list.

6. The method of claim 5, further comprising:
   providing the other flow of unicast packets to the destination device when the link provided between the first PE network device and the destination device is operational.

7. The method of claim 5, further comprising:
   dropping the other flow of unicast packets when the link provided between the first PE network device and the destination device is non-operational.

8. A first provider edge (PE) network device, comprising:
   one or more memories; and
   one or more processors to:
   receive a flow of unicast packets with a loop prevention bit,
       wherein the flow of unicast packets is received from a second PE network device associated with a non-operational link provided between the second PE network device and a destination device,
       wherein the second PE network device is a peer of the first PE network device, and
       wherein the destination device is multi-homed to the first PE device and the second PE device;
   determine whether a link provided between the first PE network device and the destination device is operational;
   determine, when the link provided between the first PE network device and the destination device is not operational, whether the loop prevention bit is set; and
   forgo returning the flow of unicast packets to the second PE network device when the link provided between the first PE network device and the destination device is non-operational and when the loop prevention bit is set; and drop the flow of unicast packets when the link provided between the first PE network device and the destination device is non-operational and when the loop prevention bit is set, wherein the flow of unicast packets is returned to the second PE network device when the link provided between the first PE network device and the destination device is non-operational and when the loop prevention bit is not set.

9. The first PE network device of claim 8, wherein the loop prevention bit is provided in a virtual extensible local area network header associated with the flow of unicast packets.

10. The first PE network device of claim 8, wherein the loop prevention bit being set provides an indication that the flow of unicast packets is received from an Ethernet segment identifier peer of the first PE network device.

11. The first PE network device of claim 8, wherein the destination device is a customer edge network device.

12. The first PE network device of claim 8, wherein the first PE network device and the second PE network device are associated with an Ethernet virtual private network-virtual extensible local area network.

13. The first PE network device of claim 8, wherein the loop prevention bit is provided in an unused reserved bit of a header associated with the flow of unicast packets.

14. The first PE network device of claim 8, wherein forgoing returning the flow of unicast packets to the second PE network device when the link provided between the first PE network device and the destination device is non-operational and when the loop prevention bit is set prevents formation of a unicast packet loop between the first PE network device and the second PE network device.

15. A non-transitory computer-readable medium storing a set of instructions, the set of instructions comprising:

one or more instructions that, when executed by one or more processors of a first provider edge (PE) network device, cause the first PE network device to:

receive a flow of unicast packets with a loop prevention bit, wherein the flow of unicast packets is received from a second PE network device associated with a non-operational link provided between the second PE network device and a destination device, wherein the second PE network device is a peer of the first PE network device, and wherein the destination device is multi-homed to the first PE network device and the second PE network device;

determine whether a link provided between the first PE network device and the destination device is operational;

provide the flow of unicast packets to the destination device when the link provided between the first PE network device and the destination device is operational;

determine, when the link provided between the first PE network device and the destination device is non-operational, whether the loop prevention bit is set;

forgo returning the flow of unicast packets to the second PE network device when the link provided between the first PE network device and the destination device is non-operational and when the loop prevention bit is set; and drop the flow of unicast packets when the link provided between the first PE network device and the destination device is non-operational and when the loop prevention bit is set, wherein the flow of unicast packets is returned to the second PE network device when the link provided between the first PE network device and the destination device is non-operational and the loop prevention bit is not set.

16. The non-transitory computer-readable medium of claim 15, wherein the one or more instructions further cause the first PE network device to:

maintain a list that includes source addresses of peers of the first PE network device;

receive another flow of unicast packets that includes a source address of the second PE network device;

determine whether the source address of the second PE network device matches one of the source addresses of the list;

provide the other flow of unicast packets to the destination device when the link provided between the first PE network device and the destination device is operational; and forgo returning the other flow of unicast packets to the second PE network device when the link provided between the first PE network device and the destination device is non-operational and based on the source address of the second PE network device matching one of the source addresses of the list.

17. The non-transitory computer-readable medium of claim 16, wherein the one or more instructions further cause the first PE network device to:

drop the other flow of unicast packets when the link provided between the first PE network device and the destination device is non-operational.

18. The non-transitory computer-readable medium of claim 15, wherein the loop prevention bit is provided in a virtual extensible local area network header associated with the flow of unicast packets, wherein the loop prevention bit being set provides an indication that the flow of unicast packets is received from an Ethernet segment identifier peer of the first PE network device.

19. The non-transitory computer-readable medium of claim 15, wherein the first PE network device and the second PE network device are associated with an Ethernet virtual private network-virtual extensible local area network.

20. The non-transitory computer-readable medium of claim 15, wherein forgoing returning the flow of unicast packets to the second PE network device when the link provided between the first PE network device and the destination device is non-operational and when the loop prevention bit is set prevents formation of a unicast packet loop between the first PE network device and the second PE network device.

* * * * *